United States Patent
Khatavkar et al.

(10) Patent No.: US 9,109,689 B2
(45) Date of Patent: Aug. 18, 2015

(54) AXLE ASSEMBLY HAVING BANJO BEAM AND STRENGTHENED COVERPAN

(71) Applicant: American Axle & Manufacturing, Inc., Detroit, MI (US)

(72) Inventors: Vijay M. Khatavkar, Pune (IN); Abhijit V. Nilangekar, Pune (IN); Mohan R. Sutar, Pune (IN)

(73) Assignee: American Axle & Manufacturing, Inc., Detroit, MI (US)

(*) Notice: Subject to any disclaimer, the term of this patent is extended or adjusted under 35 U.S.C. 154(b) by 52 days.

(21) Appl. No.: 14/190,445

(22) Filed: Feb. 26, 2014

(65) Prior Publication Data

US 2014/0243140 A1   Aug. 28, 2014

(30) Foreign Application Priority Data

Feb. 27, 2013   (IN) .......................... IN582MUM2013

(51) Int. Cl.
*F16H 57/037* (2012.01)
*F16H 48/08* (2006.01)

(52) U.S. Cl.
CPC .............. *F16H 57/037* (2013.01); *F16H 48/08* (2013.01); *Y10T 74/2188* (2015.01)

(58) Field of Classification Search
USPC .......................... 475/160; 74/606, 606 R, 607
See application file for complete search history.

(56) References Cited

U.S. PATENT DOCUMENTS

| | | | |
|---|---|---|---|
| 2,015,969 A | 10/1935 | Schildknecht | |
| 2,478,180 A | 8/1949 | Buckendale | |
| 4,234,120 A | 11/1980 | Pringle | |
| 4,625,581 A | 12/1986 | Hull | |
| 4,756,466 A * | 7/1988 | Peck | 228/165 |
| 4,760,755 A * | 8/1988 | Peck | 74/606 R |
| 4,841,802 A * | 6/1989 | Peck | 74/607 |
| 4,921,159 A * | 5/1990 | Peck | 228/182 |
| D327,280 S | 6/1992 | Macomber | |
| 5,271,294 A * | 12/1993 | Osenbaugh | 74/607 |
| 5,294,350 A | 3/1994 | Murphy et al. | |
| 5,297,855 A | 3/1994 | Jeng | |
| 7,137,183 B2 * | 11/2006 | Stuart et al. | 29/434 |
| 8,109,174 B2 * | 2/2012 | Hilker et al. | 74/606 A |
| 8,176,811 B2 * | 5/2012 | Peterson et al. | 74/606 R |
| 8,776,374 B2 * | 7/2014 | Johnston et al. | 29/897.2 |
| 2002/0134194 A1* | 9/2002 | Milio | 74/607 |
| 2004/0103748 A1* | 6/2004 | Milio et al. | 74/607 |
| 2007/0132307 A1* | 6/2007 | Fahrentholz et al. | 301/137 |
| 2008/0227581 A1* | 9/2008 | Catalano et al. | 475/220 |
| 2008/0312023 A1* | 12/2008 | Beutler et al. | 475/161 |

* cited by examiner

*Primary Examiner* — Ramya Burgess
*Assistant Examiner* — David J Hlavka
(74) *Attorney, Agent, or Firm* — Harness, Dickey & Pierce, P.L.C.

(57) ABSTRACT

An axle assembly with a banjo beam and a coverpan. The banjo beam has an upper and lower beam members that are welded together to define a central carrier portion and a pair of tubes. The upper beam member has a pair of upper spring seats that are disposed on opposite sides of the central carrier portion. The lower beam member has a pair of lower spring seats that are disposed on opposite sides of the central carrier portion. The coverpan includes a weld flange and a cover portion. The weld flange is welded to the central carrier portion via a fillet weld to close a first aperture formed in the central carrier portion. The cover portion includes a wall member into which a pair of strengthening protrusions are formed. The strengthening protrusions are disposed on opposite lateral sides of a centerline of the central carrier portion.

20 Claims, 4 Drawing Sheets

AXLE ASSEMBLY HAVING BANJO BEAM AND STRENGTHENED COVERPAN

CROSS-REFERENCE TO RELATED APPLICATIONS

This application claims the benefit of Indian Provisional Patent Application No. 582MUM2013 filed Feb. 27, 2013, the disclosure of which is incorporated by reference as if fully set forth in detail herein.

FIELD

The present disclosure relates to an axle assembly with a banjo beam and strengthened coverpan.

BACKGROUND

This section provides background information related to the present disclosure which is not necessarily prior art.

A conventional housing for a "banjo-style" axle assembly includes a banjo beam, a carrier housing and a coverpan. The banjo beam is typically formed from two mating shells that are welded together over the length of the banjo beam. The carrier housing is typically bolted to the front of the banjo beam to close a front-facing aperture in the banjo beam. The coverpan is typically welded to the rear of the banjo beam to close a rear-facing aperture in the banjo beam.

We have determined that when certain banjo-style axle assemblies are loaded, a portion of the stress transmitted through their banjo beam may be transmitted into the coverpan. Accordingly, in those axle assemblies, the coverpan will have a certain, finite fatigue life.

SUMMARY

This section provides a general summary of the disclosure, and is not a comprehensive disclosure of its full scope or all of its features.

In one form, the present teachings provide an axle assembly that includes a banjo beam and a coverpan. The banjo beam has an upper beam member and a lower beam member that are welded together to define a central carrier portion and a pair of tubes that are disposed on opposite sides of the central carrier portion. The upper beam member has a pair of upper spring seats that are disposed on opposite sides of the central carrier portion. The lower beam member has a pair of lower spring seats that are disposed on opposite sides of the central carrier portion. The coverpan includes a weld flange and a cover portion. The weld flange is welded to the central carrier portion via a fillet weld to close a first aperture formed in the central carrier portion. The cover portion includes a wall member into which a pair of strengthening protrusions are formed. The strengthening protrusions are disposed on opposite lateral sides of a centerline of the central carrier portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
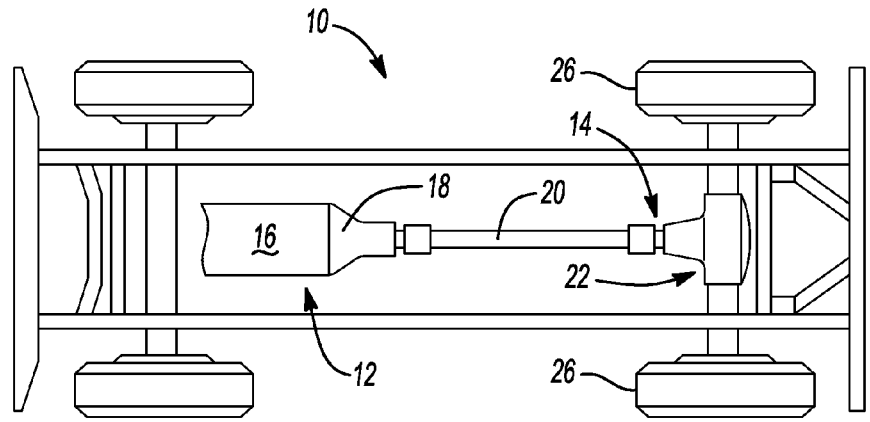
FIG. 1 is a schematic illustration of an exemplary vehicle having a banjo-style axle assembly constructed in accordance with the teachings of the present disclosure.

With reference to FIG. 1 of the drawings, an exemplary vehicle having a banjo-style axle assembly constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

Figure 2:
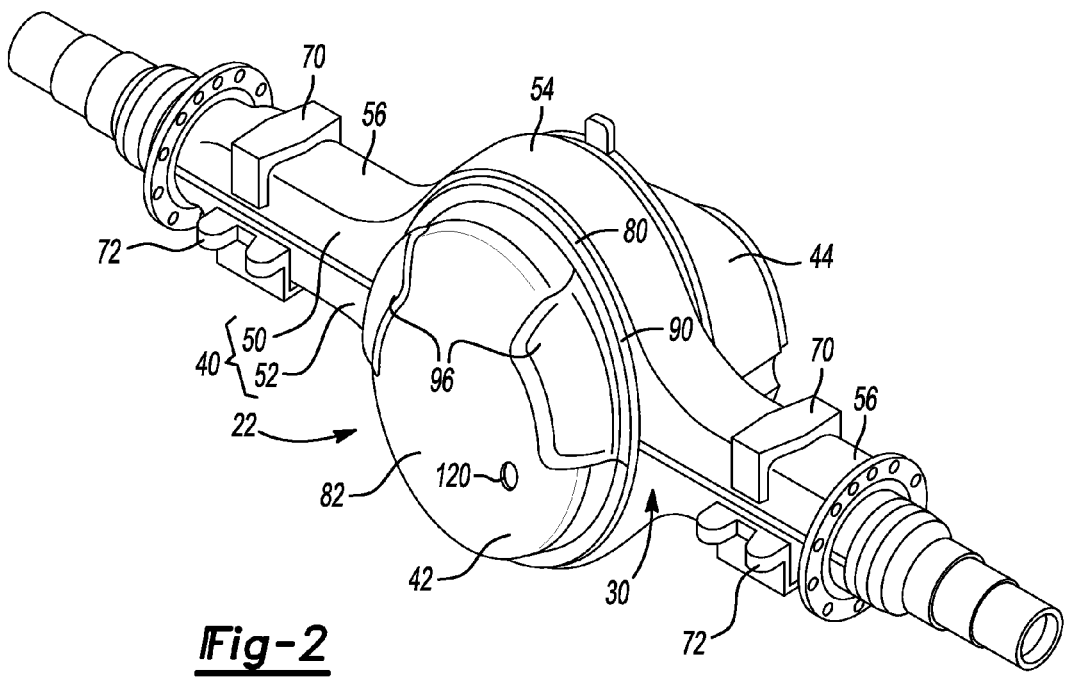
FIG. 2 is a rear perspective view of a portion of the vehicle of FIG. 1 illustrating the banjo-style axle assembly in more detail.
Figure 3:
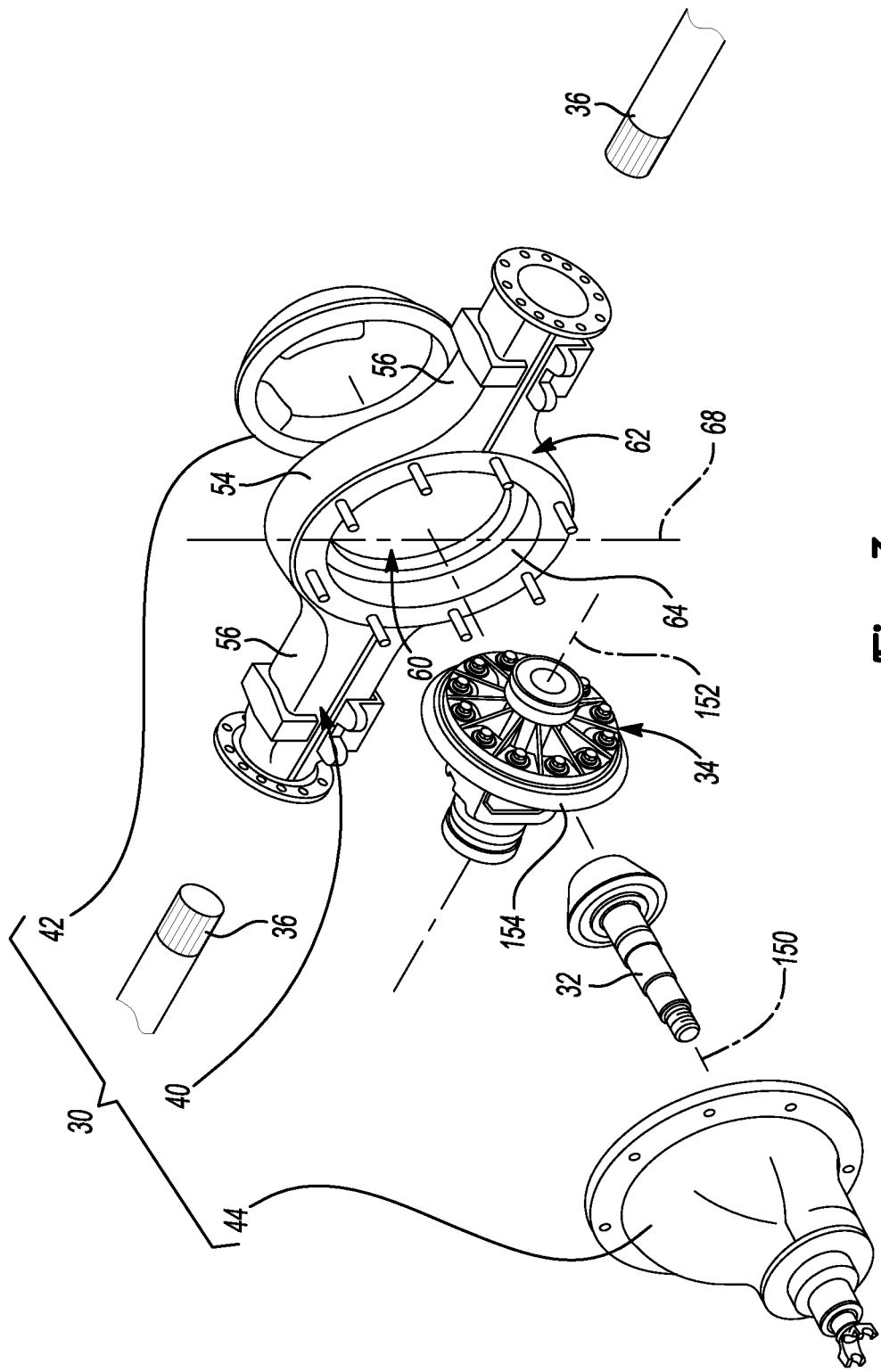
FIG. 3 is an exploded perspective view of a portion of the vehicle of FIG. 1 illustrating the banjo-style axle assembly.

With reference to FIGS. 2 and 3, the rear axle assembly 22 can be a banjo-style axle assembly and can include an axle housing 30, an input pinion 32, a differential assembly 34, and a pair of axle shafts 36. The axle housing 30 can include a banjo beam 40, a coverpan 42 and a carrier housing 44.

The banjo beam 40 can include an upper beam member 50 and a lower beam member 52 that can be welded together to define a central carrier portion 54 and a pair of tubes 56 that are disposed on opposite lateral sides of the central carrier portion 54. The central carrier portion 54 can define a central cavity 60, which is configured to receive the differential assembly 34, a first aperture 62, which can be formed in the rear of the central carrier portion 54, and a second aperture 64 that can be formed in the front of the central carrier portion 54. The central carrier portion 54 can have a centerline 68. The upper beam member 50 can have a pair of upper spring seats 70 that can be disposed on opposite lateral sides of the central carrier portion 54. The lower beam member 52 can have a pair of lower spring seats 72 that can be disposed on opposite lateral sides of the central carrier portion 54.

Figure 4:
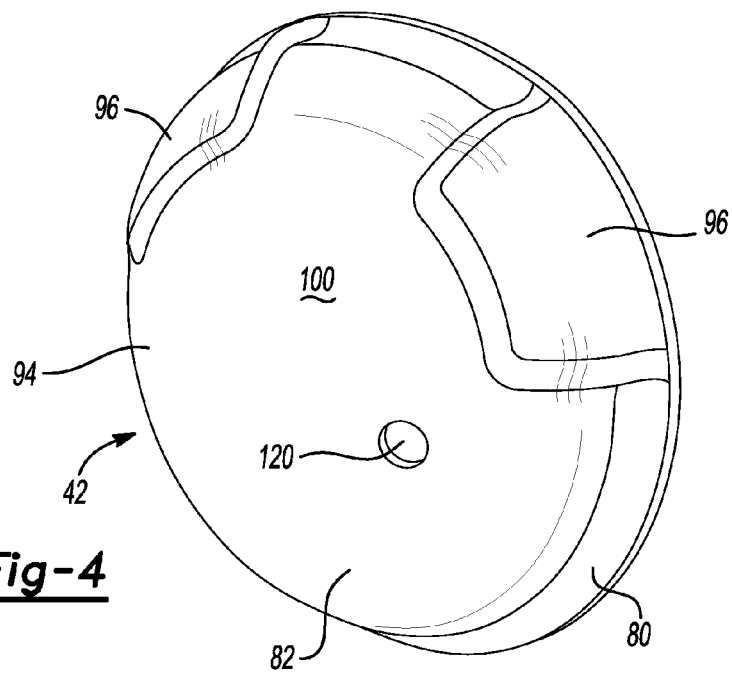
FIG. 4 is a perspective view of a portion of the vehicle of FIG. 1 illustrating a coverpan of the banjo-style axle assembly.
Figure 5:
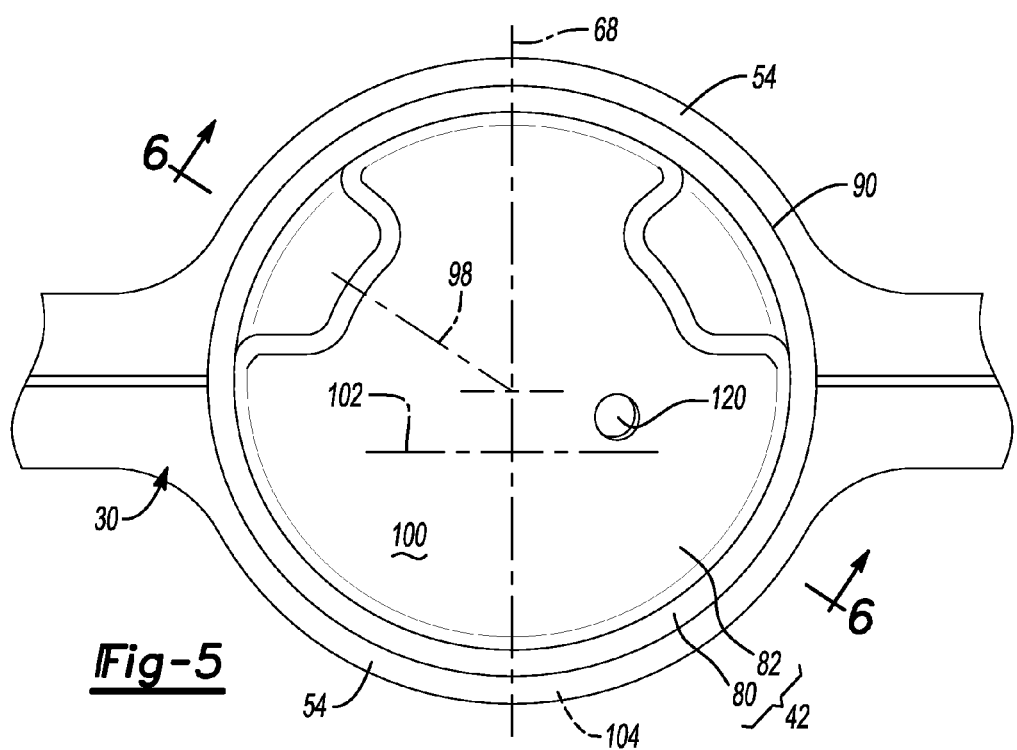
FIG. 5 is a rear elevation view of a portion of the vehicle of FIG. 1 illustrating the banjo-style axle assembly in more detail.
Figure 6:
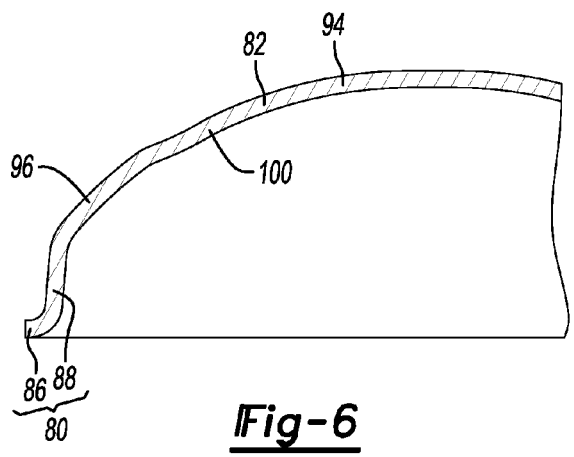
FIG. 6 is a section view taken along the line 6-6 of FIG. 5.

With reference to FIGS. 4 through 6, the coverpan 42 can comprise a weld flange 80 and a cover portion 82. The weld flange 80 can include a flange member 86 and a leg member 88. The flange member 86 can be welded to the central carrier portion 54 via a fillet weld 90 to close the first aperture 62 (FIG. 3) in the central carrier portion 54. The leg member 88 can extend from the flange member 86 and can be fixedly coupled to the cover portion 82. The cover portion 82 can include a wall member 94 into which a pair of strengthening protrusions 96 can be formed. The strengthening protrusions 96 can be disposed on opposite lateral sides of the centerline 68 of the central carrier portion 54. The strengthening protrusions 96 can be sized, shaped and located in any desired manner. In the example provided, the strengthening protrusions 96 are identically sized and shaped and are disposed symmetrically about the centerline 68 of the central carrier portion 54. More particularly, each of the strengthening protrusions 96 is formed such that its centerline 98 is offset from the centerline 68 of the central carrier portion 54 by 45 degrees (i.e., the centerlines 98 of the strengthening protrusions 96 are offset from one another by 90 degrees).

The strengthening protrusions 96 can be formed such that they extend from a surrounding portion 100 of the wall member 94 in a direction away from the central carrier portion 54. If desired, the strengthening protrusions can be disposed on the cover portion 82 at a location above a static lubricant fill level 102 to thereby not increase the amount of lubricant that is held in the sump 104 in the axle housing 30 for lubricating the differential assembly 34 (FIG. 3). The strengthening protrusions 96 can extend from the surrounding portion 100 of the wall member 94 by any desired distance, such as a distance that is less than or equal to a thickness of the wall member 94.

Figure 8:
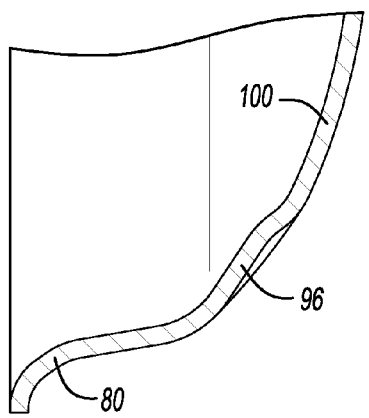
FIG. 8 is a section view taken along the line 8-8 of FIG. 7.
Figure 7:
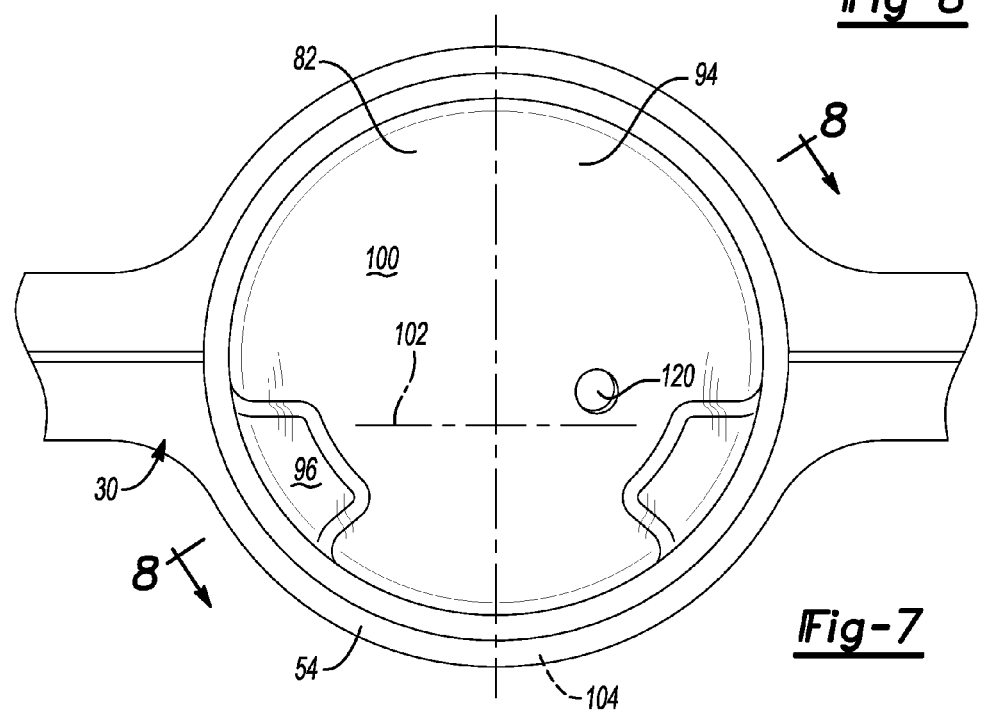
FIG. 7 is a view similar to that of FIG. 5 but illustrating an alternately constructed coverpan.

Alternatively, the strengthening protrusions 96 can be formed such that they extend inwardly into the central carrier portion 54 as is shown in FIGS. 7 and 8. If desired, the strengthening protrusions 96 can be disposed on the cover portion 82 at a location below a static lubricant fill level 102 to thereby reduce the amount of lubricant that is held in a sump 104 in the axle housing 30 for lubricating the differential assembly 34. The strengthening protrusions 96 can extend inwardly from the surrounding portion 100 of the wall member 94 by any desired distance, such as a distance that is less than or equal to a thickness of the wall member 94.

While the coverpan 42 has been depicted as having two strengthening protrusions 96 that are located below a lubricant fill line 102 and extend inwardly, or as having two strengthening protrusions 96 that are located above a lubricant fill line 102 and extend outwardly, it will be appreciated that the coverpan 42 could be constructed differently. For example, the strengthening protrusions 96 could be located below a lubricant fill line 102 and extend outwardly or could be located above a lubricant fill line 102 and extend inwardly. As yet another alternative, the coverpan 42 could include four strengthening protrusions 96. The four strengthening protrusions 96 can be configured in any desired combination, such as a configuration with four strengthening protrusions that extend inwardly; or a configuration with four strengthening protrusions that extend outwardly; or a configuration with two strengthening protrusions that extend inwardly (e.g., located below a lubricant fill line 102), and two strengthening protrusions that extend outwardly (e.g., located above a lubricant fill line 102).

If desired, a fluid fill aperture 120 can be formed in the wall member 94 of the coverpan 42.

Returning to FIG. 3, the carrier housing 44 can be removably coupled to the central carrier portion 54 to close the second aperture 64 in the central carrier portion 54. The input pinion 32 can be mounted to the carrier housing 44 for rotation about a first axis 150. The differential assembly 34 can be mounted to the carrier housing 44 for rotation about a second axis 152 that can be transverse to the first axis 150. The input pinion 32 can be configured to drive the differential assembly 34. In the particular example provided, the differential assembly 34 includes a hypoid bevel ring gear 154 that is meshingly engaged to the input pinion 32.

Each of the axle shafts 36 can be received through a corresponding one of the tubes 56 and can drivingly engage a corresponding output member (not specifically shown) in the differential assembly 34 in a conventional and well known manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
a banjo beam having an upper beam member and a lower beam member that are welded together to define a central carrier portion and a pair of tubes that are disposed on opposite sides of the central carrier portion, the upper beam member having a pair of upper spring seats that are disposed on opposite sides of the central carrier portion, the lower beam member having a pair of lower spring seats that are disposed on opposite sides of the central carrier portion; and
a coverpan that comprises a weld flange and a cover portion, the weld flange being welded to the central carrier portion via a fillet weld to close a first aperture formed in the central carrier portion, the cover portion comprising a wall member, the wall member being generally dome-shaped and defining a pair of strengthening protrusions that have generally rectangular shapes that extend longitudinally in a circumferential direction about the cover portion, the strengthening protrusions being disposed on opposite lateral sides of a centerline of the central carrier portion.

2. The axle assembly of claim 1, wherein the strengthening protrusions are identically sized and shaped.

3. The axle assembly of claim 1, wherein the strengthening protrusions are disposed symmetrically about the centerline of the central carrier portion.

4. The axle assembly of claim 3, wherein a centerline of each of the strengthening protrusions is offset from the centerline of the central carrier portion by 45 degrees.

5. The axle assembly of claim 1, wherein the strengthening protrusions extend inwardly into the central carrier portion.

6. The axle assembly of claim 5, wherein the strengthening protrusions are disposed on the cover portion at a location below a static lubricant fill level.

7. The axle assembly of claim 5, wherein the strengthening protrusions extend inwardly from an outer surface of the wall member by a distance that is less than or equal to a thickness of the wall member.

8. The axle assembly of claim 1, wherein the strengthening protrusions extend from an outer surface of the wall member in a direction away from the central carrier portion.

9. The axle assembly of claim 8, wherein the strengthening protrusions are disposed on the cover portion at a location above a static lubricant fill level.

10. The axle assembly of claim 8, wherein the strengthening protrusions extend from the outer surface of the wall member by a distance that is less than or equal to a thickness of the wall member.

11. An axle assembly comprising:
a banjo beam including:
an upper beam member; and
a lower beam member that is welded to the upper beam member to define a central carrier portion and a pair of tubes that are disposed on opposite lateral sides of a centerline of the central carrier portion; and
a coverpan including:
a weld flange having a flange member and a leg member, the flange member being welded to the central carrier portion to close a first aperture formed in the central carrier portion, the leg member extending from the flange member away from the central carrier portion; and
a cover portion including a generally dome-shaped wall member extending from the leg member, the wall member defining a pair of generally rectangular strengthening protrusions that extend longitudinally along a portion of a junction of the wall member and the leg member, the strengthening protrusions being disposed on opposite lateral sides of the centerline of the central carrier portion.

12. The axle assembly of claim 11, wherein the strengthening protrusions are disposed symmetrically about the centerline of the central carrier portion.

13. The axle assembly of claim 12, wherein a centerline of each of the strengthening protrusions is offset from the centerline of the central carrier portion by 45 degrees.

14. The axle assembly of claim 11, wherein the strengthening protrusions extend inwardly toward the central carrier portion.

15. The axle assembly of claim 14, wherein the strengthening protrusions are disposed on the cover portion at a location below a static lubricant fill level.

16. The axle assembly of claim 14, wherein the strengthening protrusions extend inwardly from the junction of the wall member and the leg member by a distance that is less than or equal to a thickness of the wall member.

17. The axle assembly of claim 11, wherein the strengthening protrusions extend from the junction of the wall member and the leg member in a direction away from the central carrier portion.

18. The axle assembly of claim 17, wherein the strengthening protrusions extend from the junction of the wall member and the leg member by a distance that is less than or equal to a thickness of the wall member.

19. An axle assembly comprising:
a banjo beam including:
an upper beam member; and
a lower beam member that is welded to the upper beam member to define a central carrier portion and a pair of tubes that are disposed on opposite lateral sides of a centerline of the central carrier portion, the upper beam member having a pair of upper spring seats that are disposed on opposite sides of the central carrier portion, the lower beam member having a pair of lower spring seats that are disposed on opposite sides of the central carrier portion; and
a coverpan including:
a weld flange having a flange member and a leg member, the flange member being welded to the central carrier portion via a fillet weld to close a first aperture formed in the central carrier portion, the leg member extending from the flange member away from the central carrier portion and having a generally cylindrical shape; and
a cover portion including a generally dome-shaped wall member extending from the leg member, and a pair of generally rectangular strengthening protrusions that extend a first length circumferentially along a junction of the wall member and the leg member, and extend a second length radially inward from the leg member, the second length being less than the first length, and the strengthening protrusions being disposed on opposite lateral sides of the centerline of the central carrier portion.

20. The axle assembly of claim 19, wherein the strengthening protrusions protrude inwardly toward the central carrier portion and are disposed below a static lubricant fill level.

* * * * *